(12) United States Patent
Radhakrishnan et al.

(10) Patent No.: US 11,971,912 B2
(45) Date of Patent: *Apr. 30, 2024

(54) SYSTEM FOR UNIFORM STRUCTURED SUMMARIZATION OF CUSTOMER CHATS

(71) Applicant: American Express Travel Related Services Company, Inc., New York, NY (US)

(72) Inventors: Priya Radhakrishnan, Bangalore (IN); Shourya Roy, Bangalore (IN)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/136,229

(22) Filed: Apr. 18, 2023

(65) Prior Publication Data

US 2023/0252058 A1    Aug. 10, 2023

Related U.S. Application Data

(63) Continuation of application No. 17/205,415, filed on Mar. 18, 2021, now Pat. No. 11,657,076.

(30) Foreign Application Priority Data

Apr. 7, 2020   (IN) .............................. 202011015288

(51) Int. Cl.
G06F 16/00   (2019.01)
G06F 16/31   (2019.01)
(Continued)

(52) U.S. Cl.
CPC ........ *G06F 16/313* (2019.01); *G06F 16/3335* (2019.01); *G06F 16/35* (2019.01);
(Continued)

(58) Field of Classification Search
CPC .... G06F 16/313; G06F 16/3335; G06F 16/35; G06F 16/36; G06F 40/30; G06F 16/3329;
(Continued)

(56) References Cited

U.S. PATENT DOCUMENTS

2010/0332287 A1* 12/2010 Gates ..................... G06Q 30/02
                                                      379/265.09
2014/0258432 A1*  9/2014 Zheng ................. H04L 12/1827
                                                        709/206

(Continued)

*Primary Examiner* — Syed H Hasan
(74) *Attorney, Agent, or Firm* — Thomas | Horstemeyer, LLP (57) ABSTRACT

At least some embodiments are directed to a system to compute uniform structured summarization of customer chats. In at least some embodiments, the system may operate a processor and receive a corpus of chats between customers and customer service representatives of an enterprise. Grouping the corpus of chats into subgroup task types and then extracting chat keywords and chat related words for each subgroup task type. Generating an expandable template data structure for each subgroup task type. Processing at least one chat to extract chat utterances and chat snippets ranking the chat utterances and chat snippets. Populating the expandable template data structure based on rankings to generate a chat summary data structure.

20 Claims, 7 Drawing Sheets

(51) Int. Cl.
*G06F 16/33* (2019.01)
*G06F 16/35* (2019.01)
*G06F 16/36* (2019.01)
*G06F 40/30* (2020.01)
*H04L 51/21* (2022.01)

(52) U.S. Cl.
CPC .............. *G06F 16/36* (2019.01); *G06F 40/30* (2020.01); *H04L 51/21* (2022.05)

(58) Field of Classification Search
CPC ..... G06F 40/205; G06F 40/284; H04L 51/21; H04L 51/04
See application file for complete search history.

(56) References Cited

U.S. PATENT DOCUMENTS

2015/0269949 A1* 9/2015 Chang ................... G10L 19/005
704/201
2015/0340033 A1* 11/2015 Di Fabbrizio .......... G10L 15/18
704/254

\* cited by examiner

201 — CM: "Replace Card"
- CCP: "Hello: I see you have a question regarding replacement. I'll quickly check that for you."
- CM: "Thank you. I damaged my Platinum card today and need to have a new card shipped"
- CCP: "Absolutely, you can do this online. I'll share the steps with you. Click on Account Services – Card management"
- CCP: "Replacement. Metal card or damaged Card replacement"
- CM: "Got it"
- CCP: "Perfect! Is there anything else I may help you with?"
- CM: "I requested the replacement for my damaged card. Will it come in metal now vs plastic? I wasn't aware that was possible"
- CCP: "It would come in metal form"
- CM: "Wow. That's pretty cool. Thanks for the heads up"
203 — CCP: "I appreciate you contacting us regarding this"

Rebmem Drac called for card replacement on platinum business credit card.
Security question (Asked/Not asked): Asked Reason for replacement: I damaged my Platinum card today and need to have a new one shipped
Suggested resolution: Absolutely, you can do this online. I'll share the steps with you. Click on Account Services – Card management
Replacement – Metal Card or damaged Card replacement Resolved: YES (Yes/No)
Approved: YES (Yes/No)

{"*CM name*" : "Rebmem Drac",
"Category" : "card replacement",
"Product" : "platinum business credit card",
"Security verification" : "yes",
"Reason" : "I damaged my Platinum card today and need to have a new one shipped",
"Resolution" : "Absolutely, you can do this online. I'll share the steps with you. Click on Account Services – Card management - Replacement – Metal Card or damaged Card replacement",
"Resolved" : "yes"
"Approved" : "yes"}

| Task | Keywords |
|---|---|
| Statement | total, interest, remaining, full, paid, last |
| Autopay enroll | autopay, debit, total, day, payments, scheduled, auto, after, fixed, enrolled |
| Profile | secure, successfully, confirm, question, window, identification, answer, update, form, change |
| Credit limit | wages, total, alimony, retirement, support, increase, income, means, maintenance, taxable |
| Benefits | uber, sky, global, pass, select, platinum, access, use, certificate, travel, benefit, lounge, club |
| Fraud phishing | investigate, suspicious, confirm, concerns, seriously, forward, unsure, spoof, phishing, fraudulent |
| Cashback | purchases, within, back, offer, blue, eligible, other, available, rewards, preferred, redeem, reward |
| Payment enquiry | within, interest, payments, auto, hours, annual, charged |
| New | current, expiration, form, mail, reason, using, proceed, sending, regarding, receive, usps, continue, cards |

FIG. 6

SYSTEM FOR UNIFORM STRUCTURED SUMMARIZATION OF CUSTOMER CHATS

CROSS-REFERENCE TO RELATED APPLICATIONS

This application is a continuation of, and claims priority to and the benefit of, co-pending U.S. patent application Ser. No. 17/205,415, entitled "SYSTEM FOR UNIFORM STRUCTURED SUMMARIZATION OF CUSTOMER CHATS and filed on Mar. 18, 2021, which claims priority to, and the benefit of, Indian Provisional Patent Application No. 202011015288, filed on Apr. 7, 2020, and entitled "SYSTEM FOR UNIFORM STRUCTURED SUMMARIZATION OF CUSTOMER CHATS," each of which is incorporated by reference as if set forth herein in its entirety.

BACKGROUND

Typically, enterprises engage in customer service or support over voice and chat channels. Typically, customer service chats are task-oriented dialogue towards achieving a customer's request or question. However, customer service chats on chat platform are typically unstructured human generated textual data that may include unwanted information. Analysis of this textual data would give valuable insights into an enterprise and the enterprises customer care.

SUMMARY OF DESCRIBED SUBJECT MATTER

In some embodiments, the present disclosure provides a method, at least having steps of receiving, by a processor, a corpus of digital chats records between a plurality of customers and a plurality of customer service representatives of an enterprise, wherein each digital chat record of the corpus of digital chat records is a chat data structure comprising chat content data and chat metadata of a digital chat record. Also, wherein each chat metadata comprises a task identifier corresponding to a task of a plurality of tasks that a customer interacted about with a customer service representative during the digital chat of the corpus of digital chat records.

The method further comprising grouping, by the processor, the corpus of digital chat records into subgroups of tasks of the plurality of tasks, wherein each subgroup corresponds to one task of the plurality of tasks; generating, by the processor via a keyword chat module, for each subgroup of digital chat records, a plurality of task keywords and a plurality of task related words from the chat content data of each digital chat record based at least in part on a tokenization analysis of the corpus of digital chat records; and generating, by the processor, for each subgroup of digital chat records, an expandable template data structure based at least in part on the plurality of task keywords and the plurality of task related words.

The method further comprises receiving, by the processor, a digital chat record; determining, by the processor, from the metadata of the digital chat record the task identifier corresponding to the task of the plurality of tasks; extracting, by the processor, a plurality of chat utterances from the chat content data from the digital chat record based at least in part on the plurality of task keywords associated with the task and the plurality of task related words associated with the task; and extracting, by the processor, a plurality of chat snippets from the plurality of chat utterances based at least in part on a data proximity window in relation to a task keyword.

The method further comprising ranking, by the processor via a template scoring module, the plurality of chat utterances and the plurality of chat snippets based at least in part on the expandable template data structure associated with the task identifier to:
i) assign a ranking score to each chat utterance and each chat snippet, and
ii) form a plurality of ranked chat utterances and a plurality of ranked chat snippets.

Modifying, by the processor, the expandable template data structure to form an adjusted template data structure based at least in part on the plurality of ranked chat utterances and the plurality of ranked chat snippets; populating, by the processor, the adjusted template data structure with a subset of the ranked chat utterances from the plurality of ranked chat utterances and a subset of the ranked chat snippets from the plurality of the ranked chat snippets based at least in part on the ranking score to form a chat summary data structure for the digital chat record; and storing, by the processor, the chat summary data structure for the digital chat record in a database.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given relating to the various embodiments of the present disclosure is intended to be illustrative, and not restrictive.

As used and referenced herein, an "enterprise" and its logical linguistic relatives and/or derivates, means a business, company or firm that engages in commerce with customers or consumers.

As used and referenced herein, "normalized" or "normalization" may refer to computations executed by a computer-based system on, for example, utterances to obtain results that do not depend on the length of the utterances or other characteristics of the utterance.

As used and referenced herein, the terms "clustering" and "cluster analysis" and their logical linguistic relatives and/or derivatives, may refer to a computer-based analysis including grouping a set of objects in such a way that objects in the same cluster (group) are more similar (in some sense) to each other than to those in other clusters (groups).

As used and referenced herein, the term "dynamically" and the term "automatically," and their logical linguistic relatives and/or derivatives, may refer to computer-based events and/or actions that can be triggered and/or occur without any human intervention.

As used and referenced herein, the terms "computer module" and "module" may refer to at least one software component and/or a combination of at least one software component and at least one hardware component designed/programmed/configured to interact with other software and/or hardware components and/or compute system outputs.

As used and referenced herein, the term, "chat" or "digital chat" may refer to the process of communicating, interacting and/or exchanging messages over the Internet or other suitable computer network. A "chat" or "digital chat" can involve two or more users that communicate through a chat-enabled service or other suitable software.

As used and referenced herein, the term "chat snippets" may refer to part or segments extracted from a chat-based communication between one or more users.

As used and referenced herein, the term "digital chat record" may refer to a digital record of, for example, a customer service chat (e.g., electronic textual data) that is a task-oriented dialogue towards achieving a customer-related or user-related objective (e.g., answering customer's question, performing customer's request, etc.).

As used and referenced herein, the term "customer" may refer to one or more users of the computer based system 100.

As used and referenced herein, the term "task' may refer to chat interactions between one or more users of the system 100. Such interactions may include requested actions or comments made by a customer to a customer service representative associated with, for example, an enterprise. A "task may also refer to chat-based communication or interactions made towards achieving a customer-related or user-related objective.

As used and referenced herein, the term "task type" may refer to a category or class of task associated with a chat-based communication between one or more users. Some examples of task types can include request, questions, comments, or other suitable type of category or class associated with one or more aspects of an enterprise.

Embodiments of the present disclosure herein describe a system and method for extracting chat summary data structures of digital chats records captured on a chat platform of an enterprise. Each digital chat record is a data structure of an interaction between, for example, a customer and a customer service representative of the enterprise. The following embodiments provide technical solutions and/or technical improvements that overcome technical problems, drawbacks and/or deficiencies in the technical field of searching and structuring customer service chats. As explained in more detail below, technical solutions and/or technical improvements herein include aspects of improved uniform structured formats for chat platforms, as well as creating computer searchable chat data structures equipped to be mined or used to generate insights regarding an enterprise.

Some embodiments of the present disclosure are directed to a technical problem of computing raw data from millions of digital chats records on a chat platform of an enterprise that are unstructured and may content unwanted information. Thus, meaningful analysis or insights into enterprise customer service information may not be mined. In some embodiments, the present disclosure has the technical solution, of at least, generating rich structured representations of the digital chat records in a human readable chat summary data structures and a SQL compatible format summary. In some embodiments, the present disclosure has the technical solution of generating chat summary data structures for digital chat records that are organized, structured, uniformed, expandable, and computer searchable. In some embodiments, the present disclosure has the technical solution of generating chat summary data structures configured to allow optimal searching of digital chat records with speed and efficiency.

Figure 1:
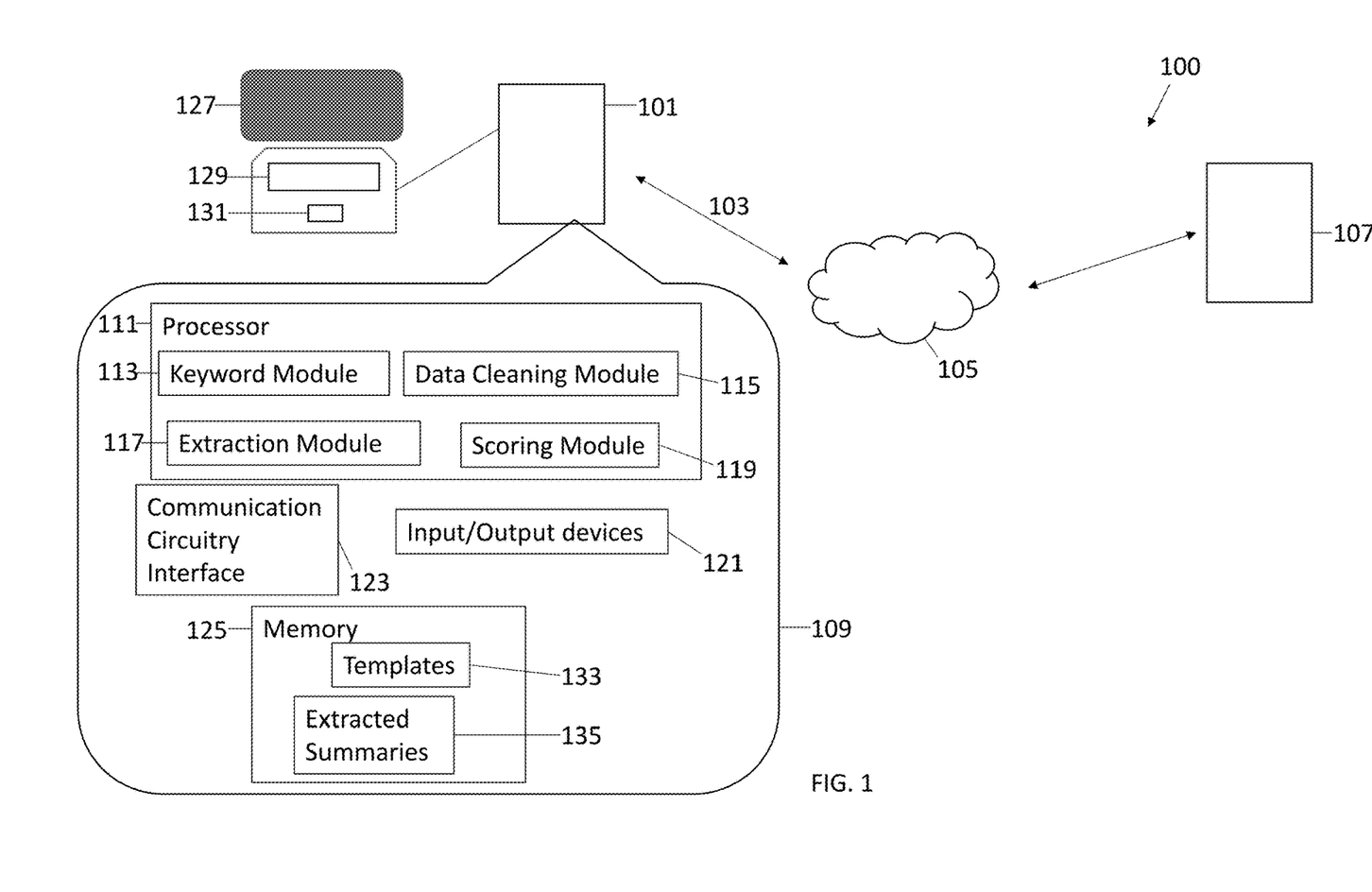
FIG. 1 shows a block diagram of a computer-based system for extracting chat summary data structures, in accordance with some embodiments of the present disclosure.

FIG. 1 is a block diagram of a computer based system 100 (hereinafter, chat summarization system) for extracting chat summary data structures from digital chat records that represent a digital chat record of an interaction captured on the chat platform between a customer and a customer service representative in accordance with an illustrative embodiment of the present disclosure. In some embodiments, chat summary system 100 may include a computer 101, such as a server, communicating 103 over a communication network 105 with any number of remote computers. In some embodiments, the chat summary system communicates with a chat platform 107 of an enterprise.

As shown in inset 109, the computer 101 may include a processor 111. In some embodiment, processor 111 may be configured to execute code, which may include a keyword module 113 for generating task keywords and task related words, a data cleaning module 115 for preparing digital chat records for extraction and ranking, an extraction module 117 for extracting specific chat content data for a chat summary data structure of the digital chat records, and a template scoring module 119 for ranking extracted chat utterances and extracted chat snippets of the digital chat records. The computer 101 may further include an input/output device 121, a communication circuitry interface 123 for communicating 103 over communication network 105, and a non-transitory memory 125. Input/output devices 121 may include, but is not limited to, a display 127, a keyboard 129 and/or a mouse 131. In some embodiments memory 125 may be configured to store, such as in a database, for example, including but not limited to, expandable template data structures 133 ready to be modified and/or populated for each task, and chat summary data structures 135 of the digital chat records. The communication circuitry interface also allows chat summary system 100 to be part of a network of computers (for example a local area network ("LAN"), a wide area network ("WAN"), or an Intranet, or a network of networks, for example the Internet.)

In some embodiments, Read-Only-Memory (ROM) (not shown) may be used and include a non-volatile storage device, such as, e.g., a magnetic disk hard drive, a solid-state drive, flash memory, or other non-volatile memory and combinations thereof. In some embodiments, system memory 125 may include a memory such as, e.g., random access memory (RAM) including dynamic RAM and/or static RAM, among other memory devices and combinations thereof. In some embodiments, memory 125 may store data resulting from processing operations, a cache or buffer of data to be used for processing operations, operation logs, error logs, security reports, among other data related to the operation of chat summary system 100.

In some embodiments, a browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device of chat summary system 100 may be specifically programmed by either Python, Java, .Net, QT, C, C++ and/or other suitable programming language.

Figure 2A:
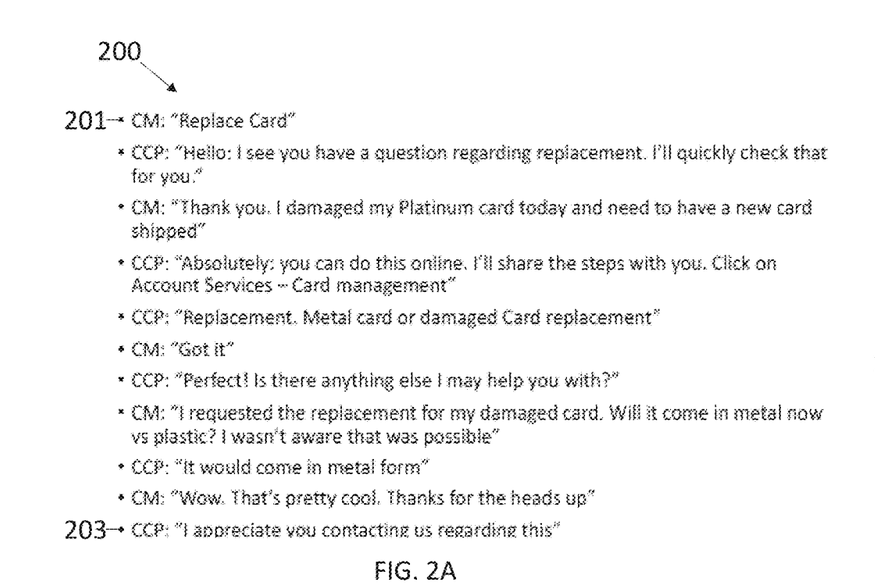
FIG. 2A shows an example view of a digital chat record on a chat platform of an enterprise in accordance with some embodiments of the present disclosure.

FIG. 2A illustrates an example of digital chat records 200 that is a digital chat record captured on a chat platform of an enterprise. In some embodiments this digital chat record is not organized, uniform, expandable and/or computer searchable. The digital chat record 200 comprises customer chat lines 201 and customer service representative chat lines 203. The customer chat line and the customer service representative chat line may be referred to generically as chat lines.

Figure 2B:
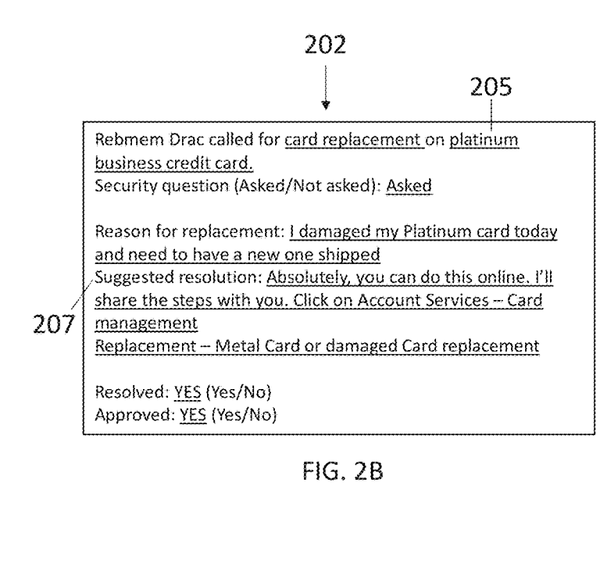
FIG. 2B shows an example of a human readable chat summary data structure in accordance with some embodiments of the present disclosure.

FIG. 2B illustrates an example of a generated human readable chat summary data structure 202. The human readable chat summary data structure, in some embodiments has a summary title 205 and relevant chat utterances 207.

Figure 2C:
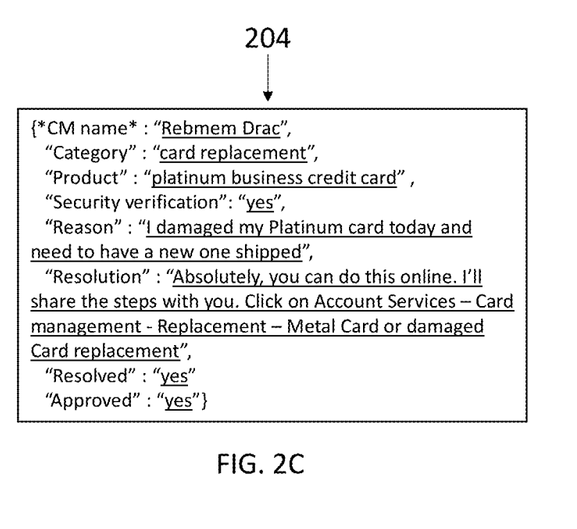
FIG. 2C shows an example of a Structured Query Language (SQL) compatible format summary in accordance with some embodiments of the present disclosure.

FIG. 2C illustrates one example of a Structured Query Language (SQL) compatible format summary 204 for the chat summary data structure that is a computer searchable chat summary data structure. In some embodiments, the searchable summary format can be a SQL compatible format. Both FIGS. 2B and 2C are explained in more detail below. In some embodiments, the SQL compatible format summary may be, but is not limited to, a JavaScript Object Notation (JSON), Extensible Markup Language (XML), or other suitable data exchange formats used to exchange data between platforms.

Figure 3:
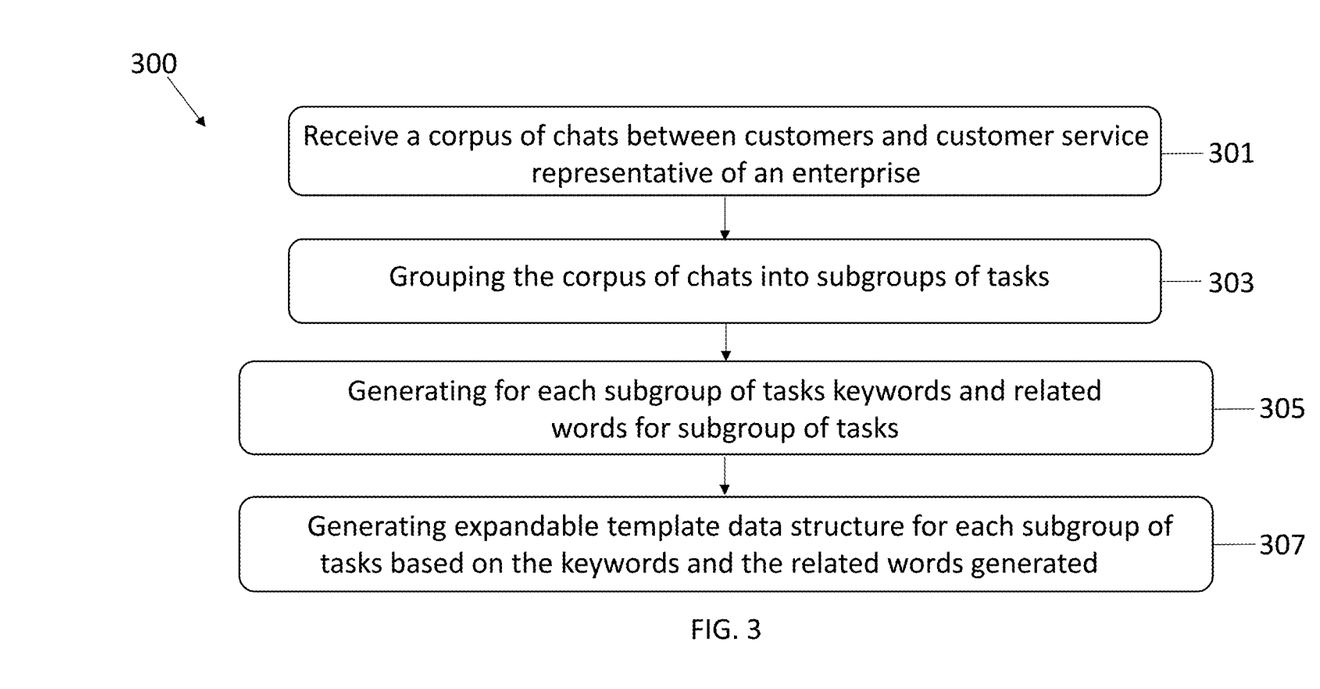
FIG. 3 shows a flowchart for a method of generating expandable template data structures, task keywords and task related words for a corpus of digital chats records in accordance with some embodiments of the present disclosure.

FIG. 3 is a flowchart of a method 300 of using chat summary system 100, as seen in FIG. 1, to generate an expandable template data structures, task keywords and task related words for a corpus of digital chat records, in accordance with one or more embodiments of the present disclosure. Method 300 may include receiving 301 a corpus of digital chat records between a plurality of customers and a plurality of customer service representatives of an enterprise. In some embodiments, each digital chat record of the corpus is a chat data structure comprising chat content data and chat metadata. In some embodiments, the chat metadata is a set of data that describes or provides information about the chat content data and the chat content data is words and/or phrases of words used in a dialogue between customers and customer service representatives. In some embodiments, the chat metadata comprises a task identifier that corresponds to a specific task involved with the interaction between the customer and the customer service representative.

Method 300 may include grouping 303 the corpus of digital chat records into subgroups of tasks. In some embodiments, there are subgroups of known tasks and each digital chat record is identified by the metadata task identifier as belonging to a subgrouping of tasks, such that each digital chat record of the corpus of digital chat records is received by chat summary system 100 already identified in the subgroup of tasks. Method 300 may include generating 305 using a keyword module 113, task keywords and task related words from a corpus of digital chat records of the same task, such that there are task keywords and task related words for each task. In some embodiments, the task keywords and the task related words are generated automatically.

In some embodiments, the keyword module of the chat summary system may be configured to receive chat content data and input the chat content data into an algorithm that may be configured to map each of the words and/or phrases of words into a plurality of embedding vectors in an n-dimensional textual embedding space. Word embedding is the collective name for a set of language modeling and feature learning techniques in natural language processing where words or phrases are mapped to vectors of real numbers. The n-dimensional textual embedding space may also be referred to as a sentence embedding space, or a discourse-based sentence embedding space. The chat content data may be represented as an n-dimensional embedding vector in the textual embedding space. Each location in the n-dimensional textual embedding space may correspond to words, combination of words, a discourse of words, or any combination thereof. The processor may identify distance between embedding vectors in textual embedding space by using Euclidean (geometrical), Manhattan, and/or Levenshtein distance in n-space for example or other suitable computation.

In some embodiments, the keyword module 113 may be configured to execute code for a TF-IDF or term frequency-inverse document frequency algorithm to generate the task keywords and the task related words. Term frequency-inverse document frequency is a term-weighting factor scheme of computational linguistic algorithms configured to reflect how important a word is. A weighting factor is a weight given to a data point to assign it a lighter, or heavier, importance in a group. A weighting factor is usually used for calculating a weighted mean, to give less (or more) importance to group members. The TF-IDF value increases proportionally to the number of times a word appears in a document, digital chat record, and is offset by the number of documents, digital chat records, in the corpus that contain the word, and this may adjust for the fact that some words appear more frequently in a general corpus.

Figure 6:
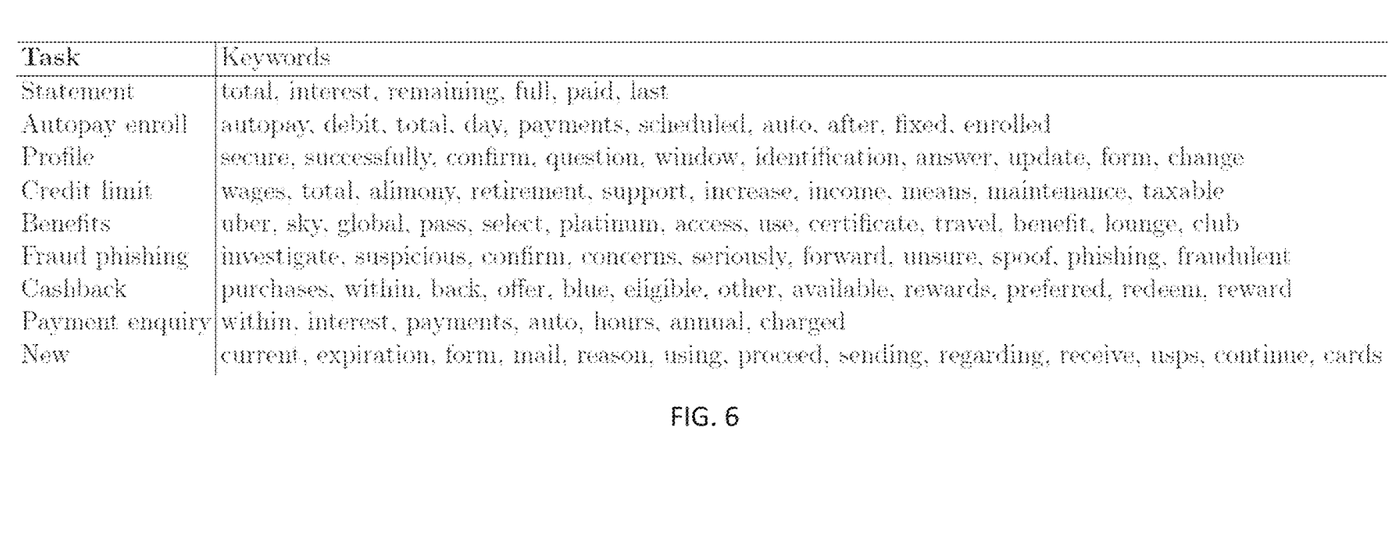
FIG. 6 is an illustrative example of some tasks and task keywords generated for those tasks in accordance with some embodiments of the present disclosure.

In some embodiments, the keyword module 113 may be configured to execute code for unigram, bigram, and trigram models of the corpus of digital chat records of the same task to generate task keywords and task related words. Unigrams, bigrams, and trigrams are different types of n-grams. An n-gram of size 1 is referred to as a "unigram"; size 2 is a "bigram" and size 3 is a "trigram". An n-gram is a contiguous sequence of n items from a given sample of text or speech collected from a corpus of text or speech. The items may be phonemes, syllables, letters, words or base pairs depending on the linguistic computation. In some embodiments, the keyword module 113 may be configured to execute an algorithm as seen in Table 1 and is configured for task keyword and task related word generation. As an example, but not limited to the list, sample task keywords generated from the algorithm of Table 1 are seen in FIG. 6.

TABLE 1 procedure Auto
Keyword Inputs:
   corpus, task
Initialize:
    Keywords, Q ← ∅
    Related Words, R ← ∅
Step #1:
    U ← Unigrams sorted
    by TF-IDF
    B ← Bigrams sorted by
    TF-IDF
    T ← Trigrams sorted
    by TF-IDF
Step #2
    Q = unigrams
    containing task R = top
    2% of B ∪ top 1% of T
    R = unique tokens of R ∪ top N of U
return Q, R The algorithm of Table 1 uses inputs of the corpus of digital chat records from a task and the keywords Q are an empty set as are the related words R. U stands for Unigrams, B for Bigrams and T for Trigrams each sorted by TF-IDF. Q is equal to unigrams that contain the task. R is set to be the top 2 percent of B and a union with the top 1 percent of T. R is then set as a unique token of R and a union to N of U, where N can be configured to correspond to a predetermined number or percentage. The unique token of R is using tokenization analysis from computational linguistic. Tokenization analysis is the process of demarcating and sometimes classifying sections of a string of input characters. The resulting tokens can be used as a sub-task of parsing input.

Method 300 may include generating expandable template data structures 307 for each subgroup of tasks based on the task keywords and the task related words generated by keyword module 113. In some embodiments, each expandable template data structure specifies the fields to be extracted from the digital chat record for that task.

Figure 4:
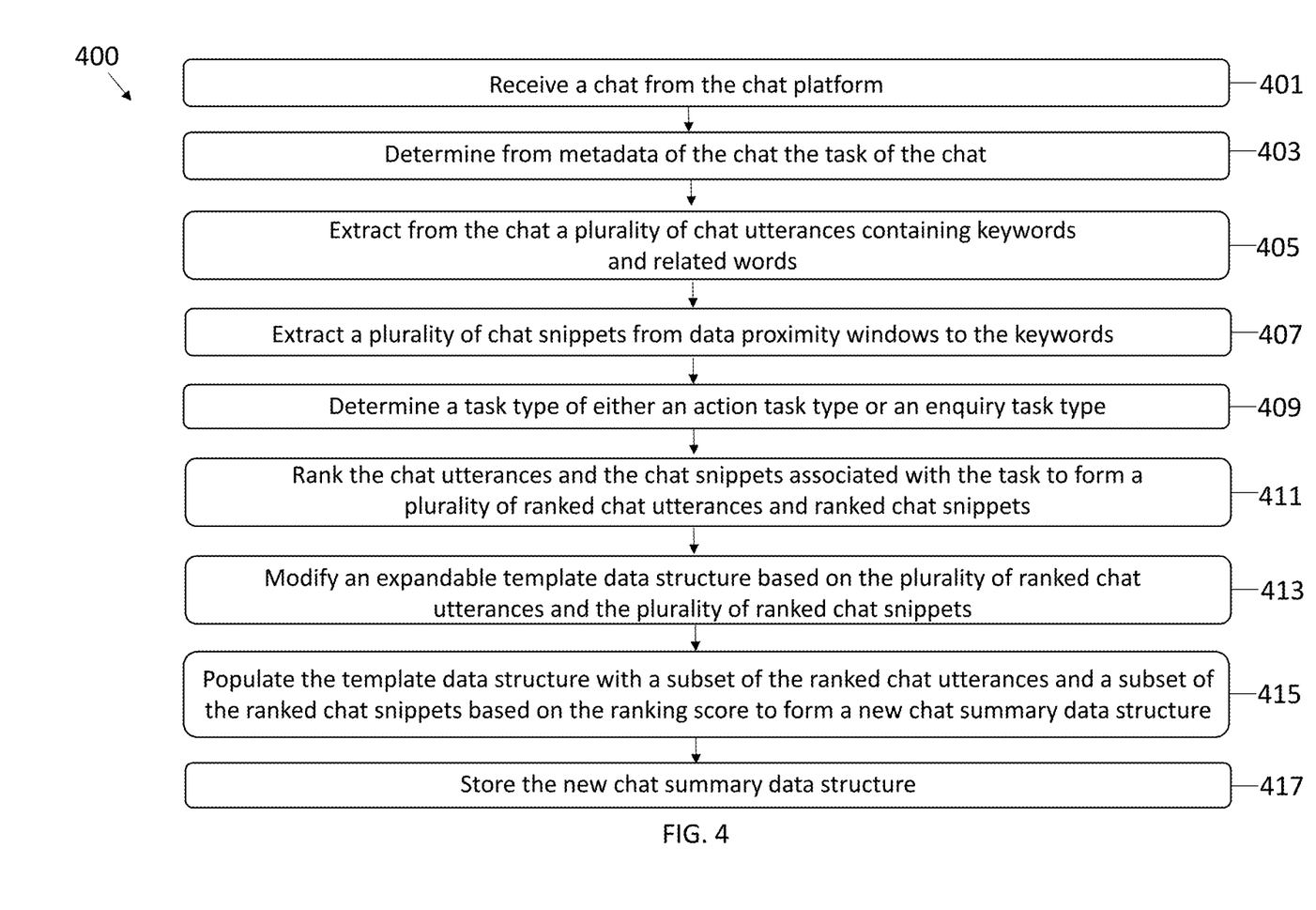
FIG. 4 illustrates a flowchart of a method for extracting and generating chat summary data structures from a digital chat record in accordance with some embodiments of the present disclosure.

FIG. 4 is a flowchart of a method 400 of using chat summary system 100 as seen in FIG. 1 to generate chat summary data structures for one or more digital chat records, in accordance with one or more embodiments of the present disclosure. Method 400 may include receiving 401 a digital chat record from the chat platform for generating a chat summary data structure. In some embodiments, the digital chat record used to generate the chat summary data structure may be from the corpus of digital chat records used in method 300 above. In some embodiments, the digital chat record used to generate the chat summary data structure may be a new digital chat record received by chat summary system 100.

Method 400 may include determining 403 the task subgrouping of the digital chat record from the metadata of the chat. In some embodiments, the digital chat record is pre-processed or data cleaned before an extraction process. In some embodiments, the data cleaning is done in data cleaning module 115. In some embodiments, the data cleaning module 115 may be configured to execute code for removal of stop words which are commonly used words in a language for example, including but not limited to, "the" and "is". In some embodiments, the data cleaning module 115 may be configured to execute code to remove one-word occurrences in a chat line such as customer chat line 201 or customer service representative chat line 203. In some embodiments, the data cleaning module 115 may be configured to execute code for Named Entity Resolution (NER), which is a differentiation between similar chat content data. In some embodiments, the data cleaning module 115 may be configured to execute code wherein content data associated with the customer or customer chat lines 201 are separated from content data associated with the customer service representative of the enterprise or customer service representative chat lines 203.

Method 400 may include extracting 405 using extraction module 117, a plurality of chat utterances from the chat content data based on task keywords associated with the task. In some embodiments, the extraction module 117 may be configured to execute code to extract chat utterances based on Term Frequency-Inverse Document Frequency. In some embodiments, the extraction module 117 may be configured to execute code and extract chat utterances based on word morphological similarity. Word morphological similarity is a method of using word parts, for example, prefixes, suffixes, roots, and stems and compare their similarities.

In some embodiments, the extraction module 117 may be configured to execute code for extraction using word semantic similarity. Word semantic similarity is a method that determines similarity by comparing word vectors in multi-dimensional meaning representations of a word. In some embodiments, the extraction module 117 may be configured to execute code for an algorithm to generate word vectors. In some embodiments, the word vectors may be generated using word2vec algorithm which is a group of related models that are shallow, two-layer neural networks that can be trained to reconstruct linguistic contexts of words, it is understood that other analogous algorithms can be equally used.

Method 400 may include extracting chat snippets 407 by extraction module 117. In some embodiments, the extraction module 117 may be configured to execute code wherein the chat snippets in the chat content data are identified by a proximity window to task keywords. In some embodiments, the proximity window can be set at 2 to 4 or other suitable range. In some embodiments, the proximity window is set at 2. A proximity window is also known as a context location and when "t" is the word compared to, or in the instant case "t" is a task keyword, and when the proximity window is set at 2, the locations are (t−2), (t−1), (t+1) and (t+2).

Method 400 may include determining 409 a type of task. In some embodiments, there are two types of tasks that are determined. In some embodiments, one type of task is an action task type for example, including but not limited to, a credit card charge dispute or a profile update on a customer account. In some embodiments, a second type of task is an inquiry task type, for example, including but not limited to, a statement balance on a bank or transaction account. In some embodiments of chat summary system 100, the digital chat records are separated by types of tasks.

Method 400 may include ranking 411 by a template scoring module 119, the chat utterances and the chat snippets. In some embodiments, the ranking assigns a ranking score to each chat utterance and each chat snippet. In some embodiments, the ranking forms a plurality of ranked chat utterances and a plurality of ranked chat snippets. In some embodiments, the ranked chat utterance and the ranked chat snippets can inform which chat utterance and chat snippets are relevant to the task and populates them into an expandable template data structure. In some embodiments, the populating of the expandable template data structure creates the automatic chat summary data structures.

In some embodiments, the expandable template data structure is modified to create an adjusted template data structure. The adjusted template data structure can be modified, in some embodiments, based at least in part on the plurality of ranked chat utterances and the plurality of ranked snippets.

In some embodiments, digital chat records that are action task types can be ranked in one method and digital chat records that are query task types can be ranked in a second method. In some embodiments, the method of ranking digital chat records that are action task types results in a highest-ranking chat utterance which is then selected as the summary title 205 for a chat summary data structure. In some embodiments of action task type, the template scoring module 119 may be configured to execute code to perform an algorithm based at least in part on a combination of weighting factor linguistic algorithm with weights for each task keyword and elements of sets functions to rank digital chat records of the action task type. In some embodiments, the template scoring module 119 may be configured to execute code to perform the algorithm as seen in Table 2 to rank chat utterances and chat related word utterances of the action task type of digital chat records.

TABLE 2

Let Q be the set of keywords and R be the set of related words for the task. Q = {$q_1$, $q_2$, ... $q_n$}, where each $q_i$ is a keyword and R = {$r_1$, $r_2$, ... $r_o$}, where $r_k$ is a related word. For each $q_i$, let P be context utterances, i.e. utterances that fall within (a fixed-size window) context of the utterance that contain $q_i$. We score P with respect to (w.r.t.) task. P = {...}, where $p_j$ is an utterance. $p_j$ is scored based on presence of keywords and related words in it.
The score of $p_j$ over Q is calculated as $$score_q(p_j) = \frac{0.2 * \text{count}(q_k: q_k \in p_j)}{\log(\text{length}(p_j))} \quad (1)$$

The score of $p_j$ over R is calculated as $$score_r(p_j) = \frac{0.2 * \text{count}(r_k: r_k \in p_j)}{\log(\text{length}(p_j))} \quad (2)$$

We defined a weight for each keyword, $w(q_i)$, as the inverse document frequency (IDF) value.
$$score(p_j) = (score_q(p_j) + score_r(p_j)) * w(q_i) \quad (3)$$
The final score is the accumulated sum of $score(p_j)$ over all $q_i$
$$\text{Score}(p_j, Q) = \Sigma_{i=1}^{n} score(p_j, q_i) \quad (4)$$
Utterances in P with highest $Score(p_j, Q)$ is extracted as summary of action task chats.

In some embodiments, the method of ranking digital chat records of inquiry task type is done using question and answer pairs since inquiry type task digital chat records have a question and answer nature. In some embodiments of inquiry type tasks, the template scoring module 119 may be configured to execute code to cluster similarities and word clusters to rank inquiry task type chats. In some embodiments of the inquiry type task, word clusters are created using morphological and semantic similarity of words. In some embodiments of the inquiry type task, morphological word-to-word distance may be measured using Levenshtein edit distance and semantic word-to-word distance that may be measured using word2vec word-vector similarity.

In some embodiments, the template scoring module 119 may be configured to execute code to perform the algorithm as seen in Table 3 that is configured to extract question answer pairs from a digital chat record and then rank the question answer pairs.

TABLE 3

```
1:   procedure Question Answer Pairs
2: Initialize:
3:   create MLC, MSC and SRC
4:
5:   function Score(utterances):
6:     for utterance do
7:       ULC = LC of utterance
8:       CCS = |{MLC} ∩ {ULC centre}|
9:       CMS = |{MLC} ∩ {ULC member}|
10:      SS = |{SRC}∩{utterance}|
11:      normalize CCS, CMS &SS
12:      rank utterance by CCS, CMS & SS
13:      return max (utterances)
14: Main:
15:   Find all utterances that are questions
16:   for question do
17:     select utterances between consecutive questions
18:     answer = max(Score(utterances))
19:     score (question − answer) =
Score(question) +
return question answer with highest score
```

Word clusters produced with morphological distance are denoted Mean Levenshtein Cluster (MLC) and semantic distance are denoted Mean Semantic Cluster (MSC) respectively. In some embodiments, the MLC and Mean of Semantic Clusters (MSC) of table 3 is created using the corpus of all digital chat records of a subgrouping of tasks and not the extracted chat utterances of one digital chat record.

The term ULC of table 3, is in some embodiments, Levenshtein Cluster of ULC and is identified from words in a chat utterance of one digital chat records and not the corpus. In table 3, the number of cluster centers of ULC that match (intersect) the cluster centers of MLC are measured as Cluster Centre Similarity (CCS). Similarly, in table 3, the number of cluster members of ULC that match (intersect) the cluster centers of MLC are measured as Cluster Member Similarity (CMS). CCS and CMS are normalized by utterance length (in words). For example, normalization can be performed based on the number of words or characters of an utterance or other characteristics of the CCS and CMS. In some instances, such a normalization can categorize utterance into, for example, short utterance, medium utterance, long utterance, or other suitable category. In some other instances, normalization can be performed by identifying the number of possible boundaries in an utterance and/or number of words or characters in an utterance.

In Table 3, the clusters in MSC are considered relevant if task keywords and task related words of the task subgrouping are present. In table 3, the number of words of the chat utterance present in semantically relevant clusters (SRC) are normalized by utterance length (in words) and denoted as semantic similarity (SS). For example, normalization can be performed based on the number of words or characters of an utterance or other characteristics of the semantically relevant clusters (SRC). SS ranks relevance of an utterance to the task. The chat utterance that scores highest based on CCS, CMS and SS is selected.

In some embodiments, the chat summary system identifies chat utterances as question based on part of speech (POS) tagging algorithms. In some embodiments, the chat summary system identifies common sequence of questions by identifying all chat utterances that end with a question mark ('?'), generate the POS tag sequences and select the top k most frequently occurrences. In some embodiments, POS tag sequences that are not useful, for example, but not limited to, "Please?" and "Are you there?", are removed. In some embodiments the POS tag sequence process is repeated. By way of example, Table 4 illustrates a list of part of speech tags used. In some embodiments, chat utterances that start with a question word such as who, what, when, and end in a question mark and whose POS tags fit a sequence for example in Table 4 are identified as questions.

TABLE 4

Question POS Sequences (ADV|VERB) + (PRON|NOUN)(VERB)(DET|ADJ)(NOUN) + (PUNC)
(ADV|VERB) + (PRON|NOUN)VERB(PRON|NOUN|DET)
(ADJ)?(NOUN)?(PUNC)(NOUN)(VERB)(DET)?(ADJ) * (NOUN) + (ADJ)?(PUNC)
(ADV|VERB) + (PRON|NOUN)(VERB)(PUNC)
(ADV|VERB) + (DET|ADJ)(NOUN)(VERB) + (PUNC)

In some embodiments of chat summary system 100, after finding the question chat utterances in a digital chat record, chat utterances that occur between two consecutive question chat utterances can be ranked by their relevance-score our other suitable metric. In some embodiments, relevance score of chat utterances can be calculated using the function Score(utterances) shown in TABLE 3. In some instances, the top ranked chat utterance between two consecutive question chat utterances are chosen as the answer to the preceding question. In some embodiments, the template scoring module 119 may be configured to execute code so one question answer pair is generated for every question. In some embodiments, when there are no chat utterances between two consecutive questions, the two consecutive questions are treated as one question. In some embodiments, the question-answer pairs are ranked by sum of scores of question and answer in that pair, see for example Table 3. In some embodiments, the top ranked question-answer pair can be the summary title 205 of the chat summary data structure of an inquiry type digital chat record.

Figure 5:
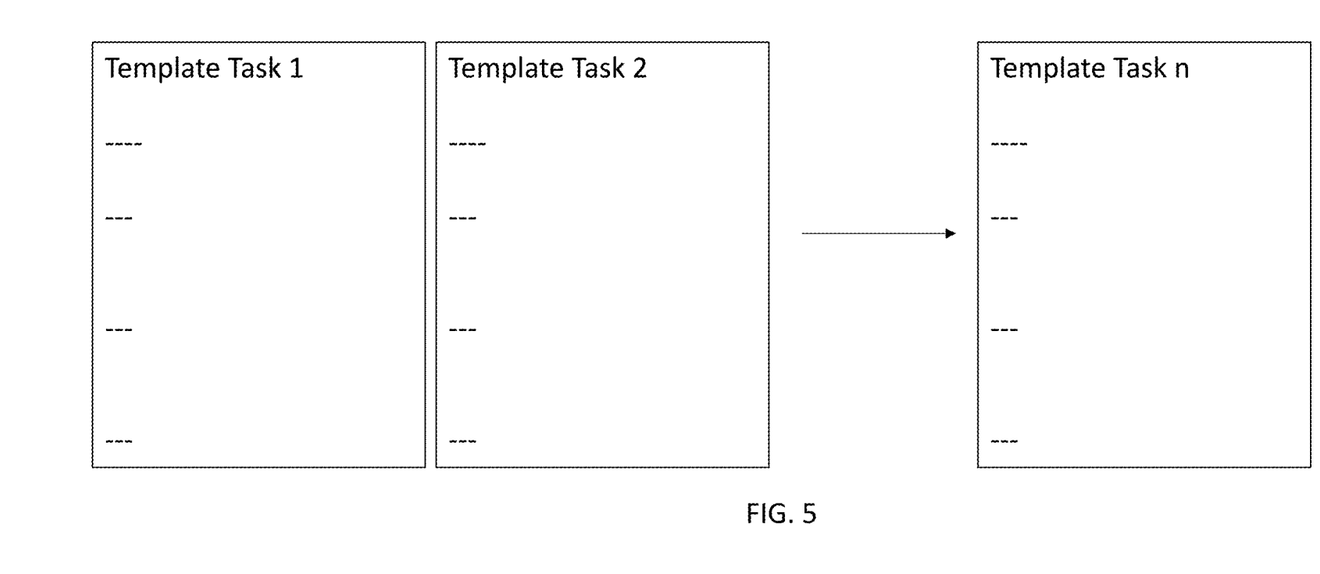
FIG. 5 illustrates a plurality of expandable template data structures that each represent one task of a plurality of tasks regarding customer interaction with a customer service representative in accordance with some embodiments of the present disclosure.

Method 400 may include modifying 413 an expandable template data structure FIG. 5 associated with a subgroup of the tasks. In some embodiments, the expandable template data structure is modified based on the ranked chat utterances and the ranked chat snippets.

Method 400 may include populating 415 an expandable template data structure, with a subset of the ranked chat utterances and a subset of the ranked chat snippets based in part on ranking scores of the chat utterances and chat snippets. In some embodiments, an adjusted template data structure (modified expandable template data structure), is populated with a subset of the ranked chat utterances and a subset of the ranked chat snippets based in part on ranking scores of the chat utterances and chat snippets. In some embodiments, the highest-ranking chat utterance or question answer pair can be used as a summary title 205 of chat summary data structure. In some embodiments of the chat summary system, the populated expandable template data structure forms the chat summary data structure. In some embodiments, the chat summary data structure is created in a human readable chat summary data structure, a SQL compatible format summary or both. Method 400 may include storing 417 the chat summary data structure or structures in memory 125.

In some embodiments, software specifically programmed in accordance with one or more principles of the present disclosure may be downloadable from a network, for example, a website, as a stand-alone product or as an add-in package for installation in an existing software application. For example, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "user" shall refer to at least one user. In some embodiments, the term "user" or "administrator" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session, or can refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, programmed computing systems with associated devices can be configured to operate in the distributed network environment, communicating with one another over one or more suitable data communication networks (e.g., the Internet, satellite, etc.) and utilizing one or more suitable data communication protocols.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of an application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

In some embodiments, the machine learning model or plurality of machine learning models of the present disclosure may be configured to utilize one or more AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, a neutral network technique may be one of, without limitation, feedforward neural network, radial basis function network, recurrent neural network, convolutional network (e.g., U-net) or other suitable network.

In some embodiments and, optionally, in combination of any embodiment described above or below, a trained neural network model may specify a neural network by at least a neural network topology, a series of activation functions, and connection weights.

The aforementioned examples are, of course, illustrative and not restrictive. At least some aspects of the present disclosure will now be described with reference to the following numbered clauses.

1. A method comprising;
   receiving, by a processor, a corpus of digital chats records between a plurality of customers and a plurality of customer service representatives of an enterprise,
      wherein each digital chat record of the corpus of digital chat records is a chat data structure comprising chat content data and chat metadata of a digital chat record, and
      wherein each chat metadata comprises a task identifier corresponding to a task of a plurality of tasks that a customer interacted about with a customer service representative during the digital chat of the corpus of digital chat records;
   grouping, by the processor, the corpus of digital chat records into subgroups of tasks of the plurality of tasks, wherein each subgroup corresponds to one task of the plurality of tasks;
   generating, by the processor via a keyword chat module, for each subgroup of digital chat records, a plurality of task keywords and a plurality of task related words from the chat content data of each digital chat record based at least in part on a tokenization analysis of the corpus of digital chat records;
   generating, by the processor, for each subgroup of digital chat records, an expandable template data structure based at least in part on the plurality of task keywords and the plurality of task related words;
   receiving, by the processor, a digital chat record;
   determining, by the processor, from the metadata of the digital chat record the task identifier corresponding to the task of the plurality of tasks;
   extracting, by the processor, a plurality of chat utterances from the chat content data from the digital chat record based at least in part on the plurality of task keywords associated with the task and the plurality of task related words associated with the task;
   extracting, by the processor, a plurality of chat snippets from the plurality of chat utterances based at least in part on a data proximity window in relation to a task keyword;
   ranking, by the processor via a template scoring module, the plurality of chat utterances and the plurality of chat snippets based at least in part on the expandable template data structure associated with the task identifier to:
      i) assign a ranking score to each chat utterance and each chat snippet, and
      ii) form a plurality of ranked chat utterances and a plurality of ranked chat snippets;

modifying, by the processor, the expandable template data structure to form an adjusted template data structure based at least in part on the plurality of ranked chat utterances and the plurality of ranked chat snippets;

populating, by the processor, the adjusted template data structure with a subset of the ranked chat utterances from the plurality of ranked chat utterances and a subset of the ranked chat snippets from the plurality of the ranked chat snippets based at least in part on the ranking score to form a chat summary data structure for the digital chat record; and storing, by the processor, the chat summary data structure for the digital chat record in a database.

2. The method of clause 1, wherein the digital chat record is received as a new digital chat record from a chat platform associated with the enterprise.

3. The method of clause 1, wherein the digital chat record is a digital chat record from the corpus of digital chats records.

4. The method of clauses 1, 2 or 3, wherein the data proximity window is a context window having a size of 2.

5. The method of any of the preceding clauses, further comprising:

parsing, by the processor, the digital chat record to remove a stop word before the extracting the plurality of chat utterances and the plurality of chat snippets.

6. The method of any of the preceding clauses, wherein the chat content data further comprises chat lines; and wherein the method further comprises:

parsing, by the processor, the digital chat record to remove a one-word chat line from the digital chat record before the extracting the plurality of chat utterances and the plurality of chat snippets.

7. The method any of the preceding clauses, further comprising:

differentiating, by the processor, similar chat content data before extracting the plurality of chat utterances and the plurality of chat snippets.

8. The method of any of the preceding clauses, further comprising;

parsing, by the processor, the digital chat record to remove a stop word before the extracting chat utterances and chat snippets.

9. The method of clauses 6, 7 or 8, further comprising separating, by the processor, the chat lines of the customer from the chat lines of the customer service representative of the enterprise.

10. The method of any of the preceding clauses, further comprising determining, by the processor, a task type for a subgroup of tasks.

11. The method of claim 10, wherein the task type for a subgroup of tasks is either an action task type or an inquiry task type.

12. The method of any of the preceding clauses, wherein the chat summary data structure comprises a human readable chat summary data structure.

13. The method any of the preceding clauses, wherein the chat summary data structure comprises a structured query language compatible format summary.

14. The method of claim 11, wherein the rank of chat utterances and chat snippets of the action task type is based on at least in part, a weighting factor algorithm, a weight identified for each task keyword and elements of sets.

15. The method of claim 11, wherein ranking the query task type further comprises;

identifying, by the processor, question-answer pairs in chat utterances and chat snippets; and ranking, by the processor via a scoring module, the question-answer pairs based on at least in part word clustering and unions of sets.

16. A system, comprising:

a processor; and a memory storing instructions which, when executed by the processor, causes the processors to:

receive, a corpus of digital chats records between a plurality of customers and a plurality of customer service representatives of an enterprise, wherein each digital chat record of the corpus of digital chat records is a chat data structure comprising chat content data and chat metadata of a digital chat record, and wherein each chat metadata comprises a task identifier corresponding to a task of a plurality of tasks that a customer interacted about with a customer service representative during the digital chat of the corpus of digital chat records;

group the corpus of digital chat records into subgroups of tasks of the plurality of tasks, wherein each subgroup corresponds to one task of the plurality of tasks;

generate via a keyword chat module, for each subgroup of digital chat records, a plurality of task keywords and a plurality of task related words from the chat content data of each digital chat record based at least in part on a tokenization analysis of the corpus of digital chat records;

generate for each subgroup of digital chat records, an expandable template data structure based at least in part on the plurality of task keywords and the plurality of task related words;

receive a digital chat record;

determine from the metadata of the digital chat record the task identifier corresponding to the task of the plurality of tasks;

extract a plurality of chat utterances from the chat content data from the digital chat record based at least in part on the plurality of task keywords associated with the task and the plurality of task related words associated with the task;

extract a plurality of chat snippets from the plurality of chat utterances based at least in part on a data proximity window in relation to a task keyword;

rank via a template scoring module, the plurality of chat utterances and the plurality of chat snippets based at least in part on the expandable template data structure associated with the task identifier to:

i) assign a ranking score to each chat utterance and each chat snippet, and ii) form a plurality of ranked chat utterances and a plurality of ranked chat snippets;

modify the expandable template data structure to form an adjusted template data structure based at least in part on the plurality of ranked chat utterances and the plurality of ranked chat snippets;

populate the adjusted template data structure with a subset of the ranked chat utterances from the plurality of ranked chat utterances and a subset of the ranked chat snippets from the plurality of the ranked chat snippets based at least in part on the ranking score to form a chat summary data structure for the digital chat record; and store the chat summary data structure for the digital chat record in a database.

17. The system of claim 16, wherein the instructions further cause the processor to:
determine a task type for a subgroup of tasks.

18. The system of claim 17, wherein the task type for a subgroup of tasks is either an action task type or an inquiry task type.

19. The system of clauses 16, 17 or 18, wherein the chat summary data structure comprises a human readable chat summary data structure.

20. The system of clauses 16, 17, or 18 wherein the chat summary data structure comprises a structured query language compatible format summary.

While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

Therefore, the following is claimed:

1. A method, comprising:
generating, by a computing device, a plurality of task keywords and a plurality of task related words from a corpus of digital chat records;
generating, by the computing device, an expandable template data structure based at least in part on the plurality of task keywords and the plurality of task related words;
extracting, by the computing device, a plurality of chat utterances from chat content data based at least in part on the plurality of task keywords associated and the plurality of task related words;
extracting, by the computing device, a plurality of chat snippets from the plurality of chat utterances;
ranking, by the computing device, the plurality of chat utterances and the plurality of chat snippets;
populating, by the computing device, a template data structure with a subset of the ranked chat utterances from the plurality of ranked chat utterances and a subset of the ranked chat snippets from the plurality of the ranked chat snippets to form a chat summary data structure for the chat content data; and
storing, by the computing device, the chat summary data structure.

2. The method of claim 1, further comprising removing, by the computing device, a stop word from the chat content data before the extracting the plurality of chat snippets from the plurality of chat utterances.

3. The method of claim 1, wherein
the chat content data further comprises chat lines; and
the method further comprises removing, by the computing device, a one-word chat line from the chat content data before the extracting the plurality of chat snippets from the plurality of chat utterances.

4. The method of claim 3, further comprising separating, by the computing device, the chat lines of a first individual from the chat lines of a second individual.

5. The method of claim 1, wherein the plurality of chat snippets are extracted from the plurality of chat utterances based at least in part on a data proximity window in relation to at least one of the plurality of task keywords.

6. The method of claim 1, further comprising:
grouping, by the computing device prior to generating the plurality of task keywords and the plurality of task related words, the corpus of digital chat records into subgroups of tasks for respective ones of a plurality of tasks; and
the plurality of task keywords and the plurality of task related words are generated for individual ones of the subgroups of tasks.

7. The method of claim 1, wherein ranking the plurality of chat utterances and the plurality of chat snippets further comprises:
identifying, by the computing device, question-answer pairs in chat utterances and chat snippets; and
ranking, by the computing device via a scoring module, the question-answer pairs based on at least in part word clustering and unions of sets.

8. A system, comprising:
a computing device comprising a processor and a memory; and
instructions stored in the memory which, when executed by the processor, cause the computing device to at least:
generate a plurality of task keywords and a plurality of task related words from a corpus of digital chat records;
generate, an expandable template data structure based at least in part on the plurality of task keywords and the plurality of task related words;
extract a plurality of chat utterances from chat content data based at least in part on the plurality of task keywords associated and the plurality of task related words;
extract a plurality of chat snippets from the plurality of chat utterances;
rank the plurality of chat utterances and the plurality of chat snippets;
populate a template data structure with a subset of the ranked chat utterances from the plurality of ranked chat utterances and a subset of the ranked chat snippets from the plurality of the ranked chat snippets to form a chat summary data structure for the chat content data; and
store the chat summary data structure.

9. The system of claim 8, wherein the instructions, when executed by the processor, further cause the computing device to at least remove a stop word from the chat content data before the extracting the plurality of chat snippets from the plurality of chat utterances.

10. The system of claim 8, wherein
the chat content data further comprises chat lines; and
the instructions, when executed by the processor, further cause the computing device to at least remove a one-word chat line from the chat content data before the extracting the plurality of chat snippets from the plurality of chat utterances.

11. The system of claim 10, wherein the instructions, when executed by the processor, further cause the computing device to at least separate the chat lines of a first individual from the chat lines of a second individual.

12. The system of claim 8, wherein the plurality of chat snippets are extracted from the plurality of chat utterances based at least in part on a data proximity window in relation to at least one of the plurality of task keywords.

13. The system of claim 8, wherein the instructions, when executed by the processor, further cause the computing device to at least:
group, prior to generation of the plurality of task keywords and the plurality of task related words, the corpus of digital chat records into subgroups of tasks for respective ones of a plurality of tasks; and the plurality of task keywords and the plurality of task related words are generated for individual ones of the subgroups of tasks.

14. The system of claim 8, wherein the instructions that cause the computing device to rank the plurality of chat utterances and the plurality of chat snippets, when executed by the computing device, further cause the computing device to at least:
   identify question-answer pairs in chat utterances and chat snippets; and
   rank the question-answer pairs based on at least in part word clustering and unions of sets.

15. A non-transitory, computer-readable medium comprising machine-readable instructions stored in the memory that, when executed by a processor of a computing device, cause the computing device to at least:
   generate a plurality of task keywords and a plurality of task related words from a corpus of digital chat records;
   generate, an expandable template data structure based at least in part on the plurality of task keywords and the plurality of task related words;
   extract a plurality of chat utterances from chat content data based at least in part on the plurality of task keywords associated and the plurality of task related words;
   extract a plurality of chat snippets from the plurality of chat utterances;
   rank the plurality of chat utterances and the plurality of chat snippets;
   populate a template data structure with a subset of the ranked chat utterances from the plurality of ranked chat utterances and a subset of the ranked chat snippets from the plurality of the ranked chat snippets to form a chat summary data structure for the chat content data; and
   store the chat summary data structure.

16. The non-transitory, computer-readable medium of claim 15, wherein the instructions, when executed by the processor, further cause the computing device to at least remove a stop word from the chat content data before the extracting the plurality of chat snippets from the plurality of chat utterances.

17. The non-transitory, computer-readable medium of claim 15, wherein
   the chat content data further comprises chat lines; and
   the instructions, when executed by the processor, further cause the computing device to at least remove a one-word chat line from the chat content data before the extracting the plurality of chat snippets from the plurality of chat utterances.

18. The non-transitory, computer-readable medium of claim 17, wherein the instructions, when executed by the processor, further cause the computing device to at least separate the chat lines of a first individual from the chat lines of a second individual.

19. The non-transitory, computer-readable medium of claim 15, wherein the instructions, when executed by the processor, further cause the computing device to at least:
   group, prior to generation of the plurality of task keywords and the plurality of task related words, the corpus of digital chat records into subgroups of tasks for respective ones of a plurality of tasks; and
   the plurality of task keywords and the plurality of task related words are generated for individual ones of the subgroups of tasks.

20. The non-transitory, computer-readable medium of claim 15, wherein the instructions that cause the computing device to rank the plurality of chat utterances and the plurality of chat snippets, when executed by the computing device, further cause the computing device to at least:
   identify question-answer pairs in chat utterances and chat snippets; and
   rank the question-answer pairs based on at least in part word clustering and unions of sets.

* * * * *